May 7, 1968  K. T. KRUEGER  3,381,696
SAFETY FUEL VALVE
Filed May 14, 1965  4 Sheets-Sheet 1
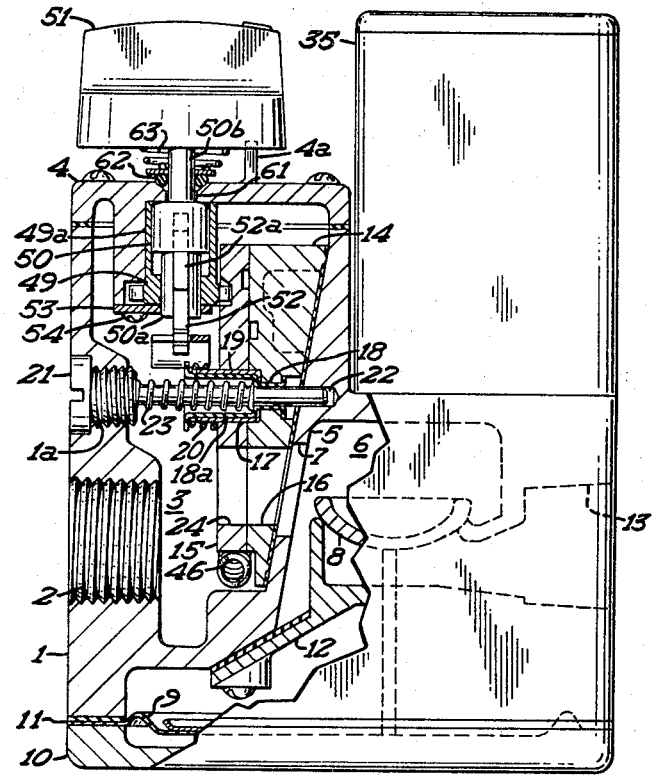
Fig 1
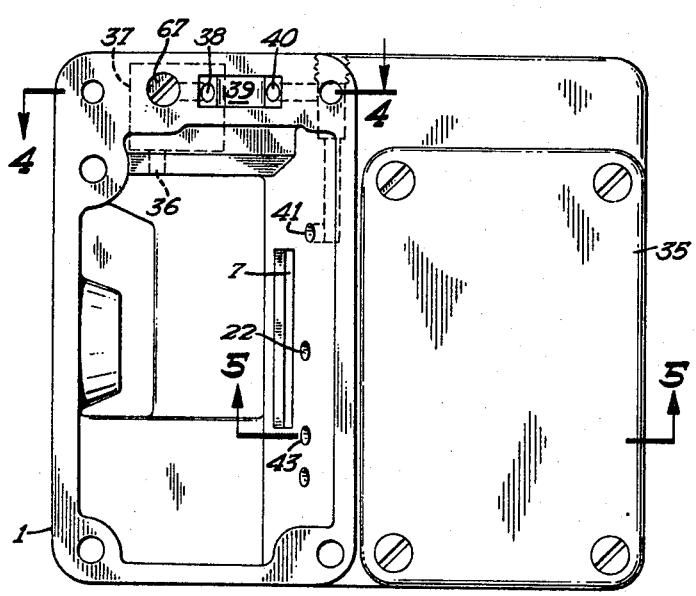
Fig 3
Fig 5
INVENTOR.
KEITH T. KRUEGER
BY
Alan M. Staubly
ATTORNEY

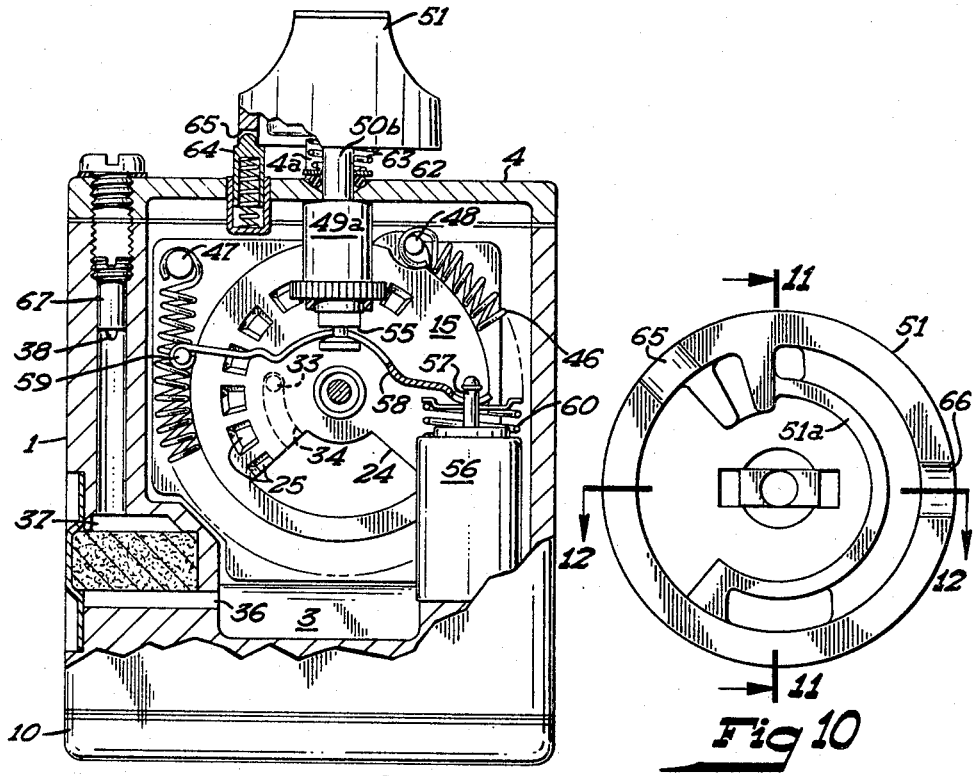
Fig 2
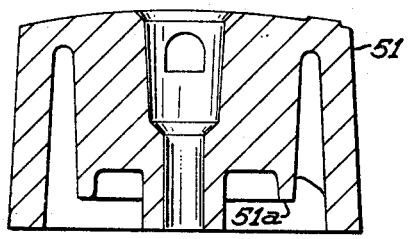
Fig 10
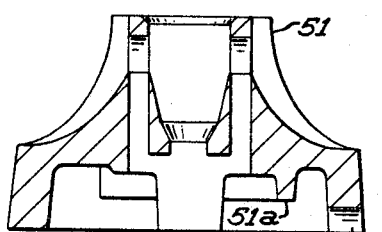
Fig 11
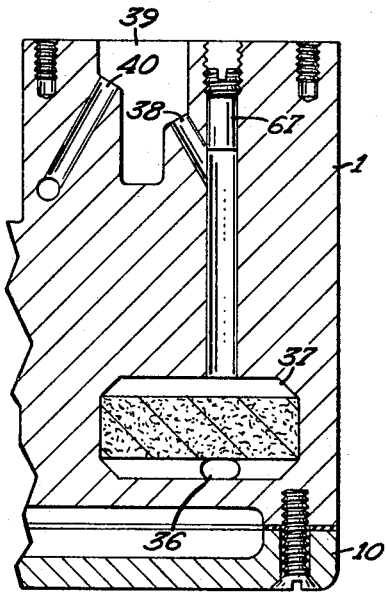
Fig 4
Fig 12
INVENTOR.
KEITH T. KRUEGER
BY
Alan M. Staubly
ATTORNEY May 7, 1968  K. T. KRUEGER  3,381,696
SAFETY FUEL VALVE
Filed May 14, 1965  4 Sheets-Sheet 3

INVENTOR.
KEITH T. KRUEGER
BY
Alan M. Staubly
ATTORNEY

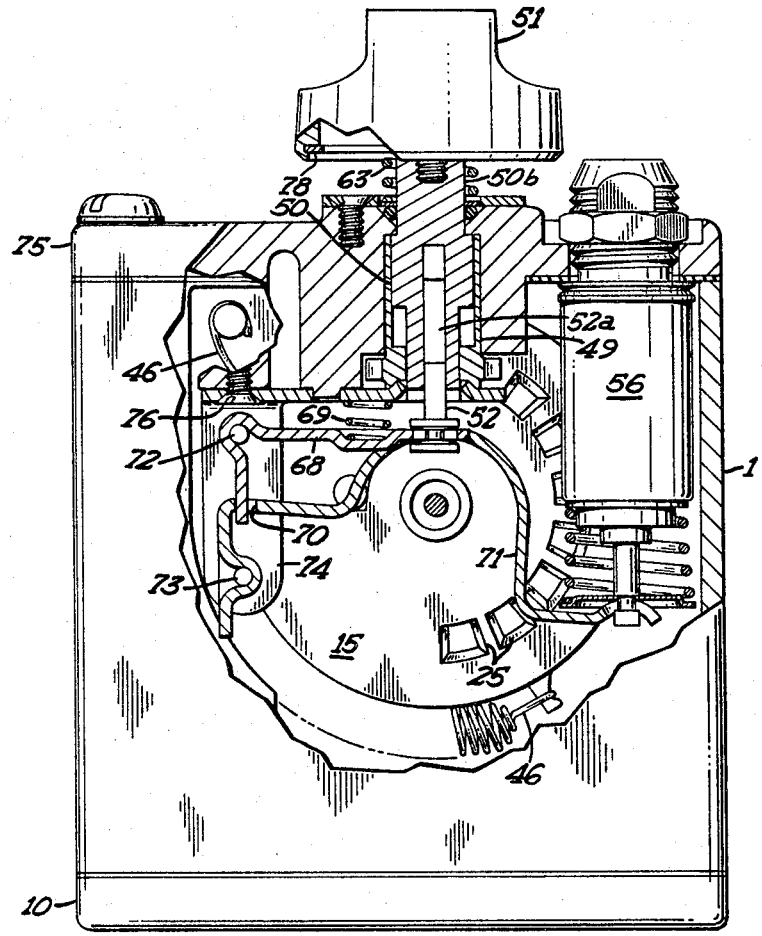
Fig 13
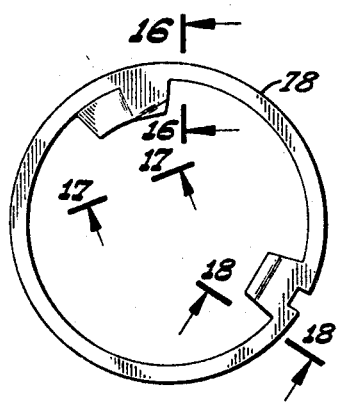
Fig 15
Fig 16
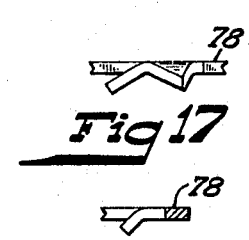
Fig 17
Fig 18
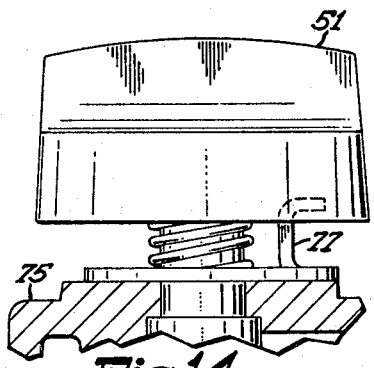
Fig 14
INVENTOR.
KEITH T. KRUEGER
BY
Alan M. Staubly
ATTORNEY United States Patent Office 3,381,696
Patented May 7, 1968

3,381,696
SAFETY FUEL VALVE
Keith T. Krueger, Garden Grove, Calif., assignor to Honeywell Inc., a corporation of Delaware
Filed May 14, 1965, Ser. No. 455,912
10 Claims. (Cl. 137—66)

ABSTRACT OF THE DISCLOSURE

A safe-lighting safety valve for main and pilot gas burners, wherein a manually-operable rotary disc valve is movable to a "pilot" position and an "on" position and is spring biased to a closed position but is capable of being held open against the spring's bias by a latching mechanism response to the presence of a pilot burner flame.

---

This invention relates to thermocouple controlled safety pilots and, more particularly, to a manifold gas valve wherein a safety pilot forms a part thereof to provide safe lighting of gas controlled thereby and flowing to gas burner heating apparatus.

Safety pilots of this general type are well known in the prior art but it has been the constant aim of the gas heating controls industry to make devices of this type more compact, more reliable in operation and less expensive. In order to provide these desired features in a manifold valve, a safety pilot making use of a rotary disc valve has been devised so as to perform the dual functions of manual control of main and pilot burner gas and safety shutdown of the gas in the event of flame failure at the pilot burner. In this way an extra safety valve has been eliminated from what has been customary in prior art devices, to reduce the cost thereof. This reduction in cost has been accomplished without sacrificing the functioning provided by the more complicated prior art arrangements. The various advantages of this invention over the prior art will become apparent upon reading the following detailed description of the invention in conjunction with the accompanying drawings wherein:

FIGURE 1 is a vertical side view of the invention with portions thereof broken away;

FIGURE 2 is a vertical end view of the invention with portions thereof broken away;

FIGURE 3 is a plan view of the invention with the cover removed over the safety pilot portion of the manifold valve and with the control valve associated therewith removed;

FIGURE 4 is an enlarged cross-sectional view through the pilot gas filter chamber and communicating passages in the valve body, taken along line 4—4 of FIGURE 3;

FIGURE 5 is a cross-sectional view taken along line 5—5 of FIGURE 3;

FIGURE 10 is an enlarged bottom view of the manually operable knob for the rotary valve, illustrated in FIGURE 2;

FIGURE 11 is an enlarged vertical cross-sectional view of the manual knob taken along line 11—11 of FIGURE 10;

FIGURE 12 is an additional cross-sectional view of the manual knob taken along line 12—12 of FIGURE 10;

FIGURE 13 is a vertical fragmentary view of a modification of the invention;

FIGURE 14 is a fragmentary view of the upper portion of the safety pilot showing the manual knob at right angles to the position shown in FIGURE 13;

FIGURE 15 is a plan view of the stop ring of the manual knob;

FIGURE 16 is a fragmentary view of the stop ring taken along line 16—16 of FIGURE 15;

FIGURE 17 is a similar view taken along line 17—17 of FIGURE 15; and

FIGURE 18 is another similar view taken along line 18—18 of FIGURE 15.

Figure 6:
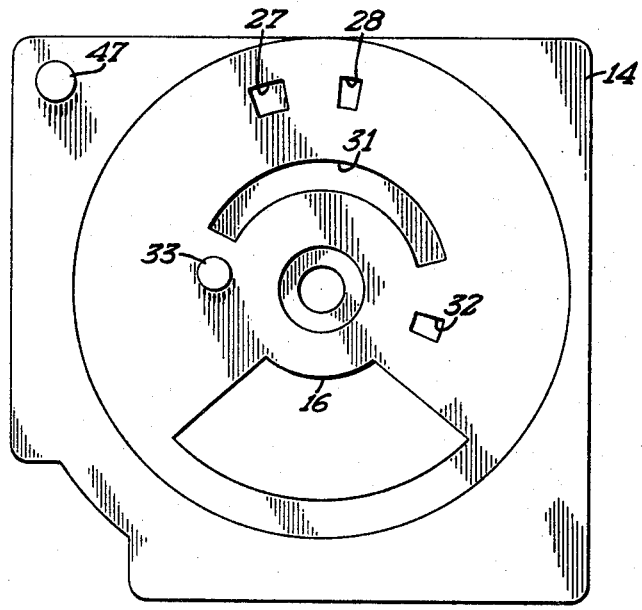
FIGURE 6 is a view of the surface plate on which the rotary valve is mounted.
Figure 9:
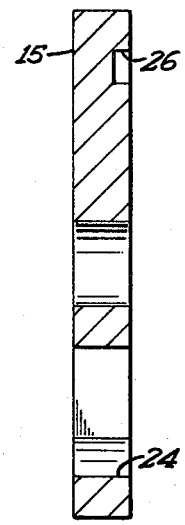
FIGURE 9 is a vertical sectional view of the disc valve taken along line 9—9 of FIGURE 7.

Referring to FIGURE 1 of the drawing, the manifold valve comprises a main body portion 1 having a threaded inlet 2 and a safety pilot valve cavity 3 therein that is closed at the top thereof by means of a cover plate 4. A wall 5 separates the cavity 3 from a main control valve cavity 6 and is apertured at 7 to provide communication between the cavities 3 and 6. As the control valve, designated by the reference numeral 8, and its actuating means are directed to another subject matter of invention from the safety pilot portion being described herein, the details thereof will not be described herein. It is being referred to only to show its relationship with this invention. May it suffice to state that the diaphragm 9, located below the valve 8, is operably connected thereto to provide the power means for operating it. The diaphragm is held against the bottom of the valve body 1 by means of a bottom cover plate 10 which is secured to the body 1 by by screws (not shown) with a sealing gasket 11 therebetween. The gas flow past the valve 8 passes through a removable valve seat subassembly 12 to a threaded outlet 13 at the opposite end of the valve body 1 from the inlet 2.

A surface plate 14, in the shape of a wedge, is pressed into sealing engagement with the inclined surface of the wall 5, preferably with a sealing gasket therebetween, to provide a valve seat for the rotary disc valve 15. The plate has an aperture 16 therein which aligns with the aperture 7 and has a stepped bore 17 therethrough through which a stepped pivot sleeve 18 extends to serve as a mounting for the valve 15. The sleeve 18 has an enlarged diameter portion 18a that fits within a cup-shaped bearing member 19 that is held at its inner end in engagement with the surface plate with the sleeve 18 serving as a rivet, being headed over in an enlarged diameter portion of the bore 17 at the opposite end of the bore from the cup-shaped member 19. The sleeve is also outwardly flanged beyond the cup-shaped member to provide an abutment for a compression spring 20 extending between the flange and the valve to hold the valve sealingly against the surface of the plate member. It is thus seen that the plate and the rotary valve are held together as a valve subassembly by means of the rivet-like sleeve 18. The subassembly is held in position against the wall 5 by means of a bolt 21 threaded into a threaded bore 12 in the valve body 1, in axial alignment with the bore 17, with a stem extending from the bolt through the sleeve 18 and into a bore 22 in the wall 5. A relatively heavy compression spring 23 extends from the inner end of the bolt to the shoulder provided by the inner end of the enlarged diameter portion of the sleeve 18.

Figure 8:
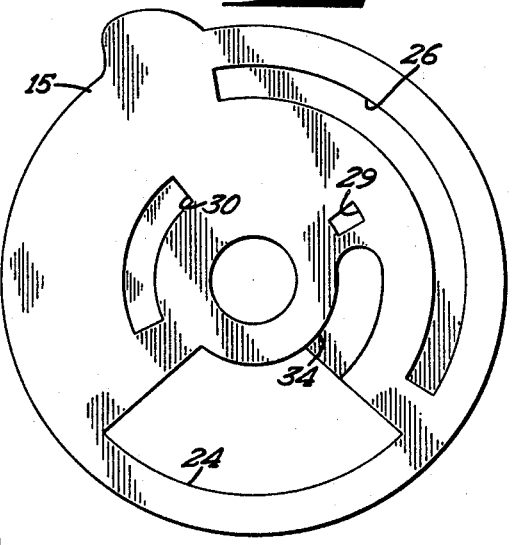
FIGURE 8 is a back view of the disc valve of FIGURE 7.
Figure 7:
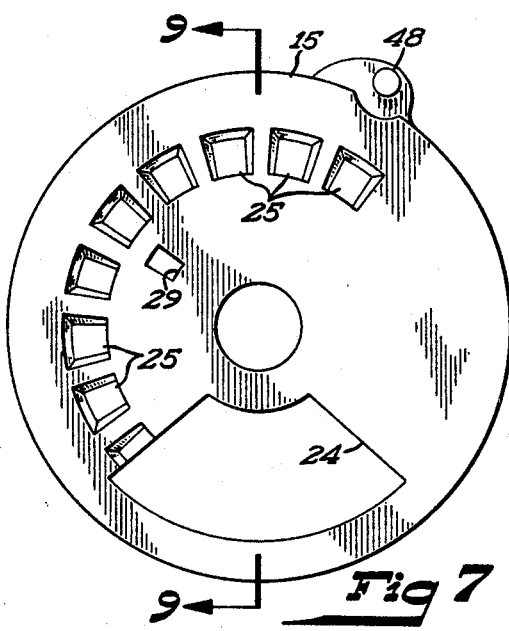
FIGURE 7 is a view of the rotary disc valve.

This arrangement provides for easy assembly of the valve unit into the valve cavity. The disc valve 15 has an aperture 24 therein that is adapted to register with the aperture 16 when the valve is in its "on" position and has notches 25 formed in an arc in the face of the disc, to form gear teeth to provide for the rotation of the disc with respect to the gas passages. In addition to the aperture 24, the disc has formed, in the face thereof bearing against the plate 14, an arcuate groove 26 adapted to register with apertures 27 and 28 through the plate 14, in the "pilot" and "on" positions of the disc valve. The disc valve also has an aperture 29 and an arcuate groove 30 in the same face of the disc which are adapted to register with an arcuate recess 31 and aperture 32, respectively, in the plate 14 in the "on" position of the disc valve. A pin 33 projects from the adjacent surface of the plate 14 and into an arcuate groove 34 in the rotary disc to serve as a stop or abutment for engagement by the end of the arcuate groove 34 and the end of the aperture 24 farthest from the groove 34. This pin limits the rotary movement between the disc and the plate in each direction. The grooves 30 and 31 and the apertures 29 and 32 are for the control gas to flow from the inlet of the valve body to the diaphragm operated valve 8 through a suitable control valve, generally designated by the reference numeral 35, shown in FIGURE 1 of the drawing. Only when the disc valve is in its "on" position will gas be able to flow from the inlet, through opening 29, groove 31, overlapping groove 30, opening 32 and through passages (not shown) to control valve 35. When the control valve calls for the opening of the main gas valve 8, gas flows from the control valve through passages (not shown) to the space below diaphragm 9 to open valve 8. Pilot gas flows from the inlet through a bore 36 (see FIGURE 4) to the filter chamber 37, through passageways 38, 39 and 40, through opening 27, arcuate groove 26, opening 28 (see FIGURES 6 and 8) and passages 43, 44 and 45 to outlet 42 (see FIGURE 5) in the wall 5 of the valve body. Flow between openings 27 and 28 is through the groove 26 in the "pilot" and "on" positions only of the rotary disc valve.

A coil tension spring 46 has one end thereof hooked over a pin 47 on the valve body 1 with the other end thereof hooked over a pin 48 on the periphery of the rotary disc valve. The intermediate portion of the spring lies on the periphery of the disc valve and bears against the surface of portions of the plate and normally biases the disc valve to its "off" position. That is, with the aperture 24 out of registration with the aperture in the plate and the groove 26 out of registration with the aperture 27.

The means for rotating the disc valve is a pinion gear 49 that has a skirt portion 49a that surrounds the stem 50 of a manually operable knob 51. The stem 50 is slotted and has a T-shaped key or latch 52 slidable therein. The stem extends through the bottom of the gear with a reduced diameter portion 50a of the stem and is normally freely rotatable in the gear. The gear is held against axial displacement with respect to the stem 50 by means of a plate 53 secured to the cover 4 by means of a bolt 54. The lower end of the T-shaped key or latch has an annular groove 55 therein and a head portion 52a at its upper end which is adapted to engage in a diametrically extending slot in the top surface of the gear, at the bottom of the skirt portion. Normally the portion 52a is out of engagement with the slot so that the gear is able to turn freely on the stem 50.

The means for holding the disc valve in its open position, is a conventional thermocouple energizable electromagnet 56 having an armature (not shown) there operably connected through a stem 57 to the free end of a lever 58. The intermediate portion of the lever 58 straddles the latch or key 52, extends through the annular groove 55, and is pivoted at its other end on a pivot 59 secured to the wall of the valve body 1. A coil compression spring 60 normally holds the lever 58 in a position to keep the head portion 52a of the key out of engagement with the slot in the gear 49. However, when the magnet is holding the armature, as it is illustrated in the drawings, the lever holds the head 52a in engagement with the slot in the gear and the knob 51 has a direct drive through the gear with the disc valve. A reduced diameter portion 50b of the stem extends through an aperture 61 in the cover 4 and is sealed against leakage by means of a rubber O-ring 62 that is spring loaded against the top of the cover 4 by means of a compression spring 63. This compression spring also normally biases the knob 51 away from the cover 4 and provides a space for movement of the head 52a of the key vertically with respect to the gear 49 when the armature is released by the magnet to disengage the latch from the gear.

An abutment 4a is provided on the cover 4 and registers with an internal arcuate rib 51a on the knob and interferes with inward movement of the knob in the "on" position thereof. In the "pilot" position of the knob, it is capable of being depressed as far as the abutment 4a is concerned but in the "pilot" position the key head 52a would not register with the slot in the gear so the knob cannot be depressed in that position also. With the valve in its "closed" position and the knob is in its "off" position, the slot in the gear will be in alignment with the head 52a of the latch and the knob may then be depressed to position the head in the slot of the gear. While in this depressed position, rotation of the knob to the "pilot" position, would position the groove 26 with respect to the pilot gas apertures 27 and 28 so that pilot gas can then flow from the inlet to the pilot burner where it may be ignited. Upon a thermocouple (not shown) being heated by the pilot flame so as to energize the magnet 56, the releasing of the knob 51 would permit it to rise under the bias of spring 63, leaving the head 52a in engagement with the slot in the gear. The knob is then free of the abutment 4a and capable of turning the gear and rotating the disc valve from the "pilot" position to its "on" position" where the aperture 24 will be held in alignment with the apertures 16 and 7 to permit gas flow to the valve 8. A spring pressed detent 64 engages notches 65 and 66 in the lower edge of the knob 51 to hold the valve in its "on" and "pilot" positions, respectively. The knob will stay in either one of these positions even after the gear has been disengaged from the knob by the action of the magnet and lever and the return of the disc valve to its "off" position under the bias of its return spring 46. In order to again open the valve, it is necessary to manually rotate the knob 51, by overcoming the yieldable resistance of the spring biased detent 64 to position the knob in the "off" position again.

The notch 66 is provided in the knob to resiliently or yieldably hold the knob in the "pilot" position to provide for pilot gas flow but no main gas flow. In this position the aperture 24 will be out of register with the aperture 16 but the arcuate slot 26 will still be establishing pilot gas flow through the apertures 27 and 28. An adjustable valve 67 is provided in the pilot gas line to regulate the amount of pilot gas flow.

The gear 49 is preferably made of a material which melts or softens at a temperature, which would result in the event of a fire around the valve or overheating of the furnace, allowing the spring 46 to close the valve 15. The material could be a plastic or low melting metal.

A modification of the valve is illustrated in FIGURE 13 of the drawing. It differs from the above described modification mainly in the reversal of the position of the magnet and the substitution of a lever arrangement which provides a different mechanical advantage between the magnet and the latch for the gear. Instead of a single lever, the latch is connected to one end of a bell crank lever 68, which is spring biased in a clockwise direction by a compression spring 69, while the other end of the bell crank lever engages a notch 70 intermediate the ends of a lever 71 which is connected to the armature of the electromagnet. The bell crank lever 68 is pivoted on a pivot 72 while the lever 71 is pivoted on a pivot 73, with both of the pivots being mounted on a bracket 74 bolted to the cover 75 by means of a bolt 76. With this arrangement, the dropping out of the armature from the magnet will cause clockwise movement of the lever 71 and counter-clockwise movement of the bell crank lever 68, to lift the latch 52 out of engagement with the gear, to free the valve to move to its "closed" position.

A further difference of this modification over the earlier described design, lies in the substitution of an L-shaped abutment member 77 for the abutment member 4a of the previous design and a stop ring 78 that rests on the upper edge of an inwardly rolled supporting flange on the knob. The abutment member is adapted to cooperate with abutments formed on the ring at the "pilot" and "on" positions thereof, but is able to be disengaged from the abutments by a slight axial movement of the knob with respect to the cover, followed by rotary movement of the abutments past the abutment means. Otherwise the modification of FIGURE 13 is the same in structure and function as the first described embodiment of the invention.

While I have described the preferred embodiments of the invention, it is deemed obvious that other modifications may be made therein without departing from the spirit of the invention. Therefore, the scope of the invention should be determined from the appended claims.

I claim:

1. A safety fuel valve comprising a valve body having an inlet, an outlet, and an apertured wall therebetween providing a valve seat; a rotary disc valve having an aperture therethrough adapted to register with the aperture in said wall and cooperable with said wall and seat to control the flow of fuel to said outlet, said valve being movable between "off" and "on" positions, means for biasing said valve to its "off" position; manually operable means for rotating said valve to the "on" position, said manually operable means including engageable and disengageable coupling means which can be placed in its engaged condition only in the "off" position of the manually operable means and valve; means for holding said manually operable means in its "on" position; and means for holding said coupling means in engagement and said valve in its "on" position in response to the presence of a pilot flame and for causing disengagement of said coupling means upon pilot flame failure to permit said biasing means to move said valve to its "off" position.

2. A safety fuel valve comprising a valve body having an inlet, a main outlet, a second outlet and an apertured wall therebetween providing a valve seat; a rotary valve having an aperture therein adapted to register with the aperture in said wall and cooperable with said wall and seat to control the flow of fuel to said main outlet, said rotary valve being movable between "off," "pilot" and "on" positions, said rotary valve also having passageways formed therein for conducting fuel from said inlet to said second outlet only in the "pilot" and "on" positions thereof; means for biasing said rotary valve to its "off" position; manually operable means for rotating said valve to the "pilot" and "on" positions; heat responsive means including engageable and disengageable coupling means for holding said valve in its "on" position in response to the presence of a pilot flame and for causing disengagement of said coupling means upon pilot flame failure to permit said biasing means to move said valve to its "off" position, said manually operable means also being movable to cause engagement of said coupling means and placing said heat responsive means in a condition to respond to heat and hold said coupling means in engagement; and means to prevent moving said valve to its "on" position until the heat responsive means is holding said coupling means in engagement.

3. In a safety fuel valve, the combination comprising a valve body having an inlet, a main outlet, a second outlet and an apertured wall therebetween providing a valve seat; a rotary valve engaging said wall and having an aperture therein adapted to register with the aperture in said wall to control the flow of fuel to said main outlet, said rotary valve being movable between "off," "pilot" and "on" positions, said rotary valve also having passageways formed therein for conducting fuel from said inlet to said second outlet in the "pilot" and "on" positions thereof; means for biasing said rotary valve to its "off" position; manually operable means for rotating said valve between the "off," "pilot" and "on" positions, said manually operable means including a knob and engageable and disengageable coupling means which can be placed in its engaged condition only in the "off" position of the manually operable means and valve; means for holding said manually operable means in its "on" position; and means for holding said coupling means in engagement and said valve in its "on" position in response to the presence of a pilot flame and for causing disengagement of said coupling means upon pilot flame failure to permit said biasing means to move said valve to its "off" position while said manually operable means remains in its "on" position.

4. The combination defined in claim 3 wherein said coupling means comprises two relatively rotatable members between said knob and said valve and an axially movable key for selectively locking and unlocking said members.

5. The combination defined in claim 4 wherein one of said members is a gear and said valve has gear teeth thereon in engagement with teeth on said gear and wherein said coupling holding means acts on said movable key.

6. In a safety fuel valve having a valve body with an inlet, a main outlet, a second outlet and an apertured wall therebetween providing a valve seat, the combination comprising a rotary valve having an aperture therein for registration with the aperture in said wall and cooperable with said wall and seat to control the flow of fuel to said main outlet, said rotary valve being movable between "off," "pilot" and "on" positions, said rotary valve also having passageways formed therein for conducting fuel from said inlet to said second outlet in the "pilot" and "on" positions thereof; means for biasing said rotary valve to its "off" position; manually operable means for rotating said valve to the "pilot" and "on" positions, said manually operable means including a knob and gear means engaging said valve and disengageable coupling means between said knob and gear means which can be placed in its engaged condition only in the "off" position of the knob and valve; means for holding said knob in its "on" position; and means for holding said coupling means in engagement and said valve in its "on" position in response to the presence of a pilot flame and for causing disengagement of said coupling means upon pilot flame failure to permit said biasing means to move said valve to its "off" position.

7. The combination defined in claim 6 wherein said gear means includes a pinion gear constantly in engagement with said valve and said coupling means includes a key slidably connected to said knob and engageable with said pinion gear.

8. A safety fuel valve comprising a valve body having an inlet, a main outlet, a second outlet and an apertured wall therebetween providing a valve seat; a rotary valve having an aperture therein adapted to register with the aperture in said wall and cooperable with said wall and seat to control the flow of fuel to said main outlet, said rotary valve being movable between "off," "pilot" and "on" positions, said rotary valve also having passageways formed therein for conducting fuel from said inlet to said second outlet in the "pilot" and "on" positions thereof; means for biasing said rotary valve to its "off" position, manually operable means for rotating said valve to the "pilot" and "on" positions, said manually operable means including a knob and stem that are axially movable, said manually operable means further including engageable and disengageable coupling means, means to prevent said knob from being moved axially to place said coupling means in engagement to actuate said valve except when the valve and knob are in their "off" position, means for holding said manually operable means in its "on" position; and means for holding said coupling means in engagement and said valve in its "on" position in response to the presence of a pilot flame and for causing disengagement of said coupling means upon pilot flame failure to permit said biasing means to move said valve to its "off" position.

9. A valve as defined in claim 8 wherein said coupling means is a slidable key and said means to prevent movement of said knob to actuate said coupling means is abutment means between said knob and the valve body.

10. A safety fuel valve comprising a valve body having an inlet, a main outlet, a second outlet and an apertured wall therebetween providing a valve seat; a valve having an aperture therein adapted to register with the aperture in said wall and cooperable with said wall and seat to control the flow of fuel to said main outlet, said valve being movable between "off," "pilot" and "on" positions, said valve also having passageways formed therein for conducting fuel from said inlet to said second outlet only in the "pilot" and "on" positions thereof; means for biasing said valve to its "off" position; manually operable means for moving said valve between the "off," "pilot" and "on" positions, said manual means including a member which is adapted to deform when heated above safe ambient temperature so as to disconnect said manual means from said valve and permit the valve to close under the bias of said biasing means, and heat responsive means for holding said valve in its "on" position in response to the presence of a pilot flame and for freeing said valve upon pilot flame failure to permit said biasing means to move said valve to its "off" position.

References Cited

UNITED STATES PATENTS

| | | | |
|---|---|---|---|
| 1,831,021 | 11/1931 | Markel | 137—65 |
| 2,258,811 | 10/1941 | Ray | 137—66 X |
| 2,381,926 | 8/1945 | Ray | 158—131 X |
| 2,746,472 | 5/1956 | Sogge | 158—131 X |
| 2,789,572 | 4/1957 | Madden | 137—73 |
| 3,254,660 | 6/1966 | Ray | 137—66 |

WILLIAM F. O'DEA, *Primary Examiner.*

R. GERARD, *Assistant Examiner.*